United States Patent [19]

Takeuchi et al.

[11] 4,428,274

[45] Jan. 31, 1984

[54] VACUUM BOOSTER DEVICE

[75] Inventors: Hiroo Takeuchi, Asashina; Nobuaki Hachiro; Yoshihisa Miyazaki, both of Ueda, all of Japan

[73] Assignee: Nissin Kogyo Kabushiki Kaisha, Nagano, Japan

[21] Appl. No.: 275,772

[22] Filed: Jun. 22, 1981

[30] Foreign Application Priority Data

Sep. 10, 1980 [JP] Japan ................................ 55-125743

[51] Int. Cl.³ .............................................. F15B 9/10
[52] U.S. Cl. ................... 91/369 A; 60/547.1; 92/98 D; 92/102; 92/165 PR
[58] Field of Search ................. 60/547 R, 547.1; 91/369 A, 376 R; 92/98 D, 99, 102, 165 PR, 166

[56] References Cited

U.S. PATENT DOCUMENTS

| 4,256,016 | 3/1981 | Thomas | 91/369 A |
| 4,270,353 | 6/1981 | Thomas | 60/581 |
| 4,325,218 | 4/1982 | Weiler | 60/547 R |
| 4,328,738 | 5/1982 | Hamamatsu | 92/165 PR |
| 4,330,996 | 5/1982 | Becht | 91/376 R |
| 4,334,459 | 6/1982 | Riedel | 92/166 |
| 4,339,921 | 7/1982 | Schanz | 60/547 R |
| 4,377,966 | 3/1983 | Parker | 92/98 D |

FOREIGN PATENT DOCUMENTS

| 2922299 | 12/1979 | Fed. Rep. of Germany | 91/369 A |
| 54-156982 | 12/1979 | Japan | 91/369 A |
| 2009871 | 6/1979 | United Kingdom | 60/547 R |
| 2031086 | 4/1980 | United Kingdom | 91/369 A |

Primary Examiner—Abraham Hershkovitz
Attorney, Agent, or Firm—Armstrong, Nikaido, Marmelstein & Kubovcik

[57] ABSTRACT

A vacuum type brake booster device comprising a booster shell, a booster piston accommodated in the booster shell, a piston diaphragm working together with the booster piston for dividing the booster shell into front and rear working chambers, and tie rods extending through the piston and the diaphragm for connection of the front and rear walls of the booster shell. The piston diaphragm is provided with reasonably arranged reinforcing beads integrally formed projected therewith for increasing the tensile rigidity of the diaphragm. Accordingly, the thrust force produced by the pressure difference between both the working chambers can be effectively transmitted from the piston diaphragm to the booster piston.

7 Claims, 2 Drawing Figures 4,428,274

VACUUM BOOSTER DEVICE

BACKGROUND OF THE INVENTION

This invention relates to vacuum booster devices of automotive brake master cylinder and, more particularly, to improvements in those of the type comprising a booster shell, a booster piston axially slidably accommodated in the booster shell, a piston diaphragm the inner and outer peripheral edges of which are respectively fixed to the rear surface of the booster piston and the inner peripheral surface of the booster shell, a front side first working chamber and a rear side second working chamber defined in the booster shell by the booster piston and piston diaphragm, said first working chamber communicating with a vacuum supply source, said second working chamber selectively communicating with the first working chamber or the external atmosphere through a control valve, an input rod arranged opposite to the booster piston for movement toward and away from the latter and connected to the control valve so as to produce a pressure difference between both the working chambers effective to cause the booster piston to follow forward movement of the input rod, tie rods extending through the booster piston for connection of the front and rear walls of the booster shell, and a sealing means arranged between the tie rod and booster piston for enabling the booster piston to be operable.

In case of the above-mentioned booster device, the booster shell can be protected from the effect of the forward thrust loaded from the output side by transmitting the load to the automobile body through the tie rods, so that such rigidity high enough to bear the above loading is not required to be given and, what is advantageous, the booster shell can be made less in weight by being formed of thin steel sheets, synthetic resins or the like.

When said piston diaphragm is provided with the through holes for passing the tie rods therethrough, the tensile rigidity of the piston diaphragm shows a lowering tendency and, as a result of increase in the elongation of the piston diaphragm due to the pressure difference between both the first and second working chambers, the thrust load due to the above pressure difference is not effectively applied to the booster piston on occasion during the boosting operation.

SUMMARY OF THE INVENTION:

The present invention has been proposed to satisfy such requirements as mentioned above and has for its primary object the provision of a new and improved vacuum booster device of the type described wherein the piston diaphragm is free from lowering of the tensile rigidity notwithstanding the existence of the tie rod through holes and, accordingly, such defects as above-mentioned are eliminated.

The above and other objects, features and advantages of the present invention will become apparent from the following description when taken in conjunction with the accompanying drawings, which illustrate a presently preferred embodiment of the invention.

DESCRIPTION OF THE PREFERRED EMBODIMENT

An embodiment of the present invention will be explained with reference to the drawings.

Figure 1:
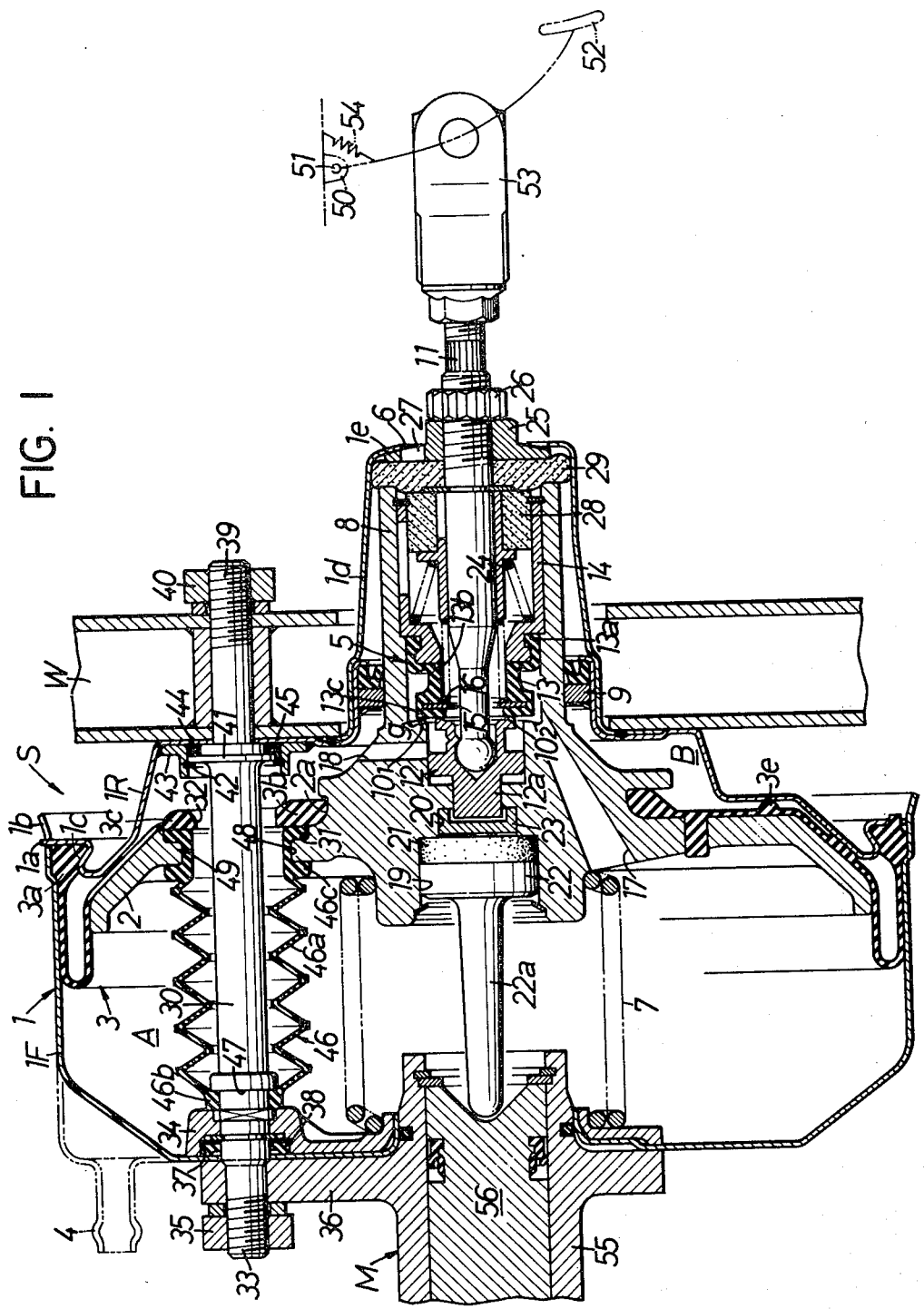
FIG. 1 is a longitudinal cross-sectional view in side elevation illustrating a preferred form of vacuum booster device embodying the present invention.
Figure 2:
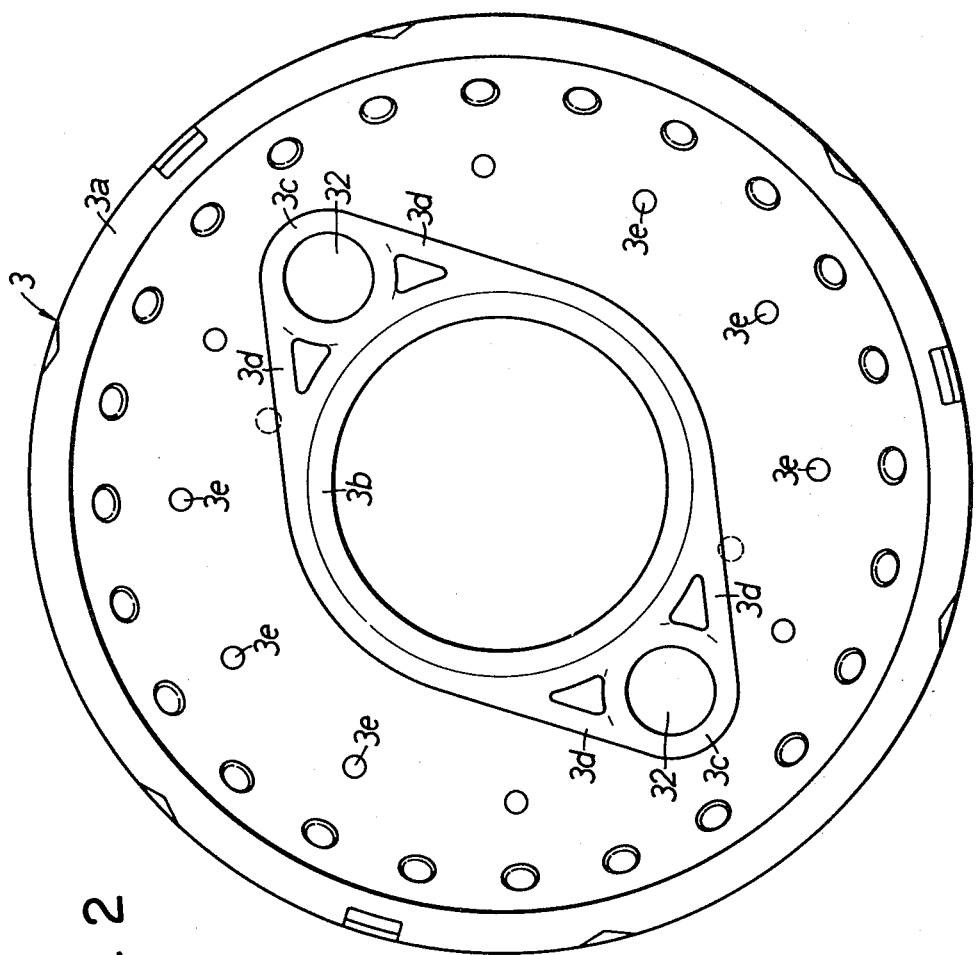
FIG. 2 is a plan view showing the piston diaphragm of the device of FIG. 1.

In FIG. 1, a vacuum booster device, generally denoted by S, has a booster shell 1 which is composed of a pair of front and rear bowls 1F and 1R formed of light thin steel plate or synthetic resin. The rear bowl 1R has a plurality of projections 1a formed around an opening of the rear bowl 1R at equal circumferential intervals. The projections 1a are fitted to a plurality of notches 1b formed around an opening of the front bowl 1F at equal circumferential intervals so as to position the bowls 1F and 1R in place. The bowls 1F and 1R are connected together through singular or plural tie rods 30 extending between opposing front and rear walls thereof. The connection between the booster shell 1 and tie rods 30 will be described later in detail.

The interior space of the booster shell 1 is divided into a front side first working chamber A and a rear side second working chamber B by a booster piston 2 axially slidably accommodated therein, with a piston diaphragm 3 formed of such flexible material as rubber or the like and joined to the rear face of the booster piston 2.

The piston diaphragm 3 is of annular shape as a whoe and has annular beads 3a and 3b integrally formed, respectively, with outside and inside edges thereof and respectively fitted in annular grooves 1c and 2a respectively formed in a joining portion of both the bowls 1F and 1R and in a rear face of the booster piston 2. The first working chamber A is always held in communication with a vacuum supply source in the form of an intake manifold (not shown) of an associated internal combustion engine through a vacuum inlet pipe 4, while the second working chamber B is selectively placed in communication with the first working chamber A or an air inlet port 6 open to the end wall 1e of a rearward extension tube 1d of the booster shell 1 through a control valve 5 which will be described later in detail.

The booster piston 2 is normally biased rearward, or toward the second working chamber B by a return spring 7 arranged under compression in the first working chamber A. The rearward travel of the booster piston 2 under the spring bias is limited by projections 3e formed on the rear face of the piston diaphragm 3 for abutting engagement with the rear inside wall of the booster shell 1.

The booster piston 2 and the piston diaphragm 3 are respectively provided with through holes 31 and 32 for passing the tie rods 30 therethrough. The through hole 32 is open to the front face of the piston diaphragm 3 separable from the booster piston 2.

An annular bead 3c is integrally formed around a peripheral edge of the through hole 32, and at least two straight beads 3d are formed projected on one side, rear side in the illustration, of the piston diaphragm 3 extending between both the beads 3b and 3c and almost in line with the common tangents to the annular beads 3b and 3c. Those beads 3b, 3c and 3d together contribute to increase of the tensile rigidity of the piston diaphragm 3.

A tubular valve casing 8 integrally formed with the booster piston 2 is axially extending rearward from the rear face of the central portion of the booster piston 2 and is slidably supported by a plain bearing 9 provided in said extension tube 1d while the rear end of which is open to said air inlet port 6.

The control valve 5 is constructed inside the tubular valve casing 8 as follows: an annular first valve seat $10_1$ is formed on the front inside wall of the tubular valve casing 8; a valve piston 12 connected to an input rod 11 is slidably fitted in the front part of the tubular valve casing 8; and an annular second valve seat $10_2$ encircled by said first valve seat $10_1$ is formed at the rear end of the valve piston 12.

A cylindrical valve element 13 with both ends opened is held at its base end portion 13a between the inside wall of the valve casing 8 and the outer periphery of a valve retainer sleeve 14 fitted inside the valve casing 8. The valve element 13 is formed of elastic materials such as rubber or the like and has a thin diaphragm 13b radially extending inward from the base end portion 13a, and a thick valve portion 13c formed at the inner end of the diaphragm 13b and opposed to the first and second valve seat $10_1$ and $10_2$. The valve portion 13c is axially movable owing to the deformation of the diaphragm 13b and capable of abutting engagement with the front end surface of the valve retainer sleeve 14.

An annular reinforcing plate 15 is inlaid in the valve portion 13c and is worked by a valve spring 16 for assisting the valve portion 13c in movement toward both the valve seats $10_1$ and $10_2$.

A space radially outside of the first valve seat $10_1$, a middle space between both the first and second valve seats $10_1$, $10_2$ and a space radially inside of the second valve seat $10_2$ are respectively in communication with the first working chamber A, the second working chamber B and the air inlet port 6 respectively through a through hole 17 formed in the booster piston 2, another through hole 18 and a space inside the valve element 13.

A large hole 19 is opened in the front center of the booster piston 2, and a small hole 20 is opened at the recessed end of the large hole 19. An elastic piston 21 made of rubber or the like and an output piston 22 of the same diameter with the former are slidably fitted in the large hole 19 in order from the recessed end thereof while a reaction piston 23 of a smaller diameter than that the elastic piston 21 is slidably fitted in the smaller hole 20. A small shaft 12a projected from the front end surface of said valve piston 12 is protruded into the small hole 20 and opposed to the rear end surface of the reaction piston 23. The output piston 22 is integrally formed with a forwardly projected output rod 22a.

The input rod 11 is normally biased rearward by a return spring 24 and the rearward travel thereof is limited by abutting engagement of a movable stopper plate 25 screw-fitted to the input rod 11 with the end wall 1e inside of the rearward extension tube 1d. Axial location of the input rod 11 is changed by turning the screw-fitted movable stopper plate 25 and accordingly the retracting limit of the input rod 11 can be adjusted either forward or rearward. The movable stopper plate 25 is fixed after the adjustment by fastening a lock nut 26 also screw-fitted to the input rod 11. The movable stopper plate 25 is provided with a vent 27 for preventing the blocking of the air inlet port 6.

Air filter elements 28 and 29 are fitted in the outer end opening of the tubular valve casing 8 for purifying the air induced through the air inlet port 6 and are transformable in order not to prevent the operation of the input rod 11.

The mechanism for connection of the tie rods 30 and the booster shell 1 will be described hereinafter.

The tie rod 30 is integrally formed with a mounting bolt 33 which is passed through and forwardly protruded from the front wall of the booster shell 1, and a spring retainer plate 34 is closely fitted to the front inside wall of the booster shell 1. The tie rod 30, the spring retainer plate 34 and the front wall of the booster shell 1 are integrally connected with a mounting flange 36 of the brake master cylinder M placed on the front surface of the booster shell 1 by fastening a nut 35 screwed in the tip end of the mounting bolt 33 passed through the mounting flange 36. On this occasion, an annular sealing material 38 is filled in an annular groove 37 formed in the front surface of the spring retainer plate 34 encircling the bolt 33 and is airtightly brought into contact with the bolt 33, spring retainer plate 34 and the front wall inside of the booster shell 1. With this arrangement, leakage through the two paths, between the front inside wall of the booster shell 1 and the spring retainer plate 34 and between the spring retainer plate 34 and the bolt 33, can be prevented by the use of the single annular sealing material 38. The fixed end of the return spring 7 is supported by the spring retainer plate 34 so that the springing force of the return spring 7 is loaded to the tie rods 30 to eliminate the loading on the booster shell 1.

Furthermore, the tie rod 30 is integrally formed with a mounting bolt 39 which is passed through and rearwardly protruded from the rear wall of the booster shell 1 and a stepped flange 41 for abutment against the rear inside wall of the booster shell 1. The stepped flange 41 is fitted in a support cylinder 43 welded to the rear inside wall of the booster shell 1 and, by setting a retaining ring 42 in the support cylinder 43, the tie rod 30 and the rear wall of the booster shell 1 are connected together. On this occasion, an annular sealing material 45 is filled in an annular groove 44 between the smaller step of the stepped flange 41 and the support cylinder 43.

The tie rod 30 is fixed to the front wall W of the compartment by fastening a nut 40 screwed in the tip end of the mounting bolt 39 passed through the front wall W of the automobile compartment.

In this way, the booster shell 1 is fitted to the front wall W of the compartment through the tie rod 30, while the brake master cylinder M is supported by the booster shell 1 through the tie rods 30.

A sealing means is arranged between a through hole 31 in the booster piston 2 for passing the tie rod 30 therethrough and the tie rod 30 in such a manner as not to prevent the operation of the booster piston 2. The sealing means comprises a flexible bellows 46 made of elastic materials such as rubber or the like. Outside of the tie rod 30 is covered with a tubular part 46a of the bellows 46 and a front end 46b of the bellows 46 is fitted in an annular groove 47 formed outside the tie rod 30 while a rear end 46c of the bellows 46 is fixed to the booster piston 2 by fitting an annular groove 48 formed outside the bellows 46 to an annular projection 49 formed inside the through hole 31. The through hole 32 is sealed by closely but separably mating the rear end 46c of the bellows 46 with a portion surrounding the through hole 32 in the front face of the piston diaphragm 3. A clearance between 46c and 3 is produced by the pressure difference only when the air pressure of the first working chamber A exceeds that of the second working chamber b.

Inside the compartment, a brake pedal 52 jointed at 51 to the fixed bracket 50 is connected to the rear end of the input rod 11 of the booster device S through an adjustable pedal link 53. Reference number 54 indicates a return spring for retracting the brake pedal 52 rearward.

Rear end of a cylinder body 55 of the brake master cylinder M is protruded into the first working chamber A through the front wall of the booste shell 1, and the output rod 22a of the booster device S is opposed to the rear end of a working piston 56 fitted in the cylinder body 55.

Description will next be made of the operation of the embodiment described above.

The drawings indicate the booster device S not in operation. The valve piston 12, input rod 11 and brake pedal 52 connected together are held at a prescribed retracting position with the force of the return spring 24 while a movable stopper plate 25 is abutted to the fixed end wall 1e. Front face of the valve portion 13c is pushed by the valve piston 12 through the second valve seat $10_2$ and retracted until slightly touched to the front face of the valve retainer sleeve 14, so that a thin gap g is made between the first valve seat $10_1$ and the valve portion 13c. Above condition can easily be obtained by adjusting the movable stopper plate 25.

In this way, while the engine is in operation, the first working chamber A is always held at vacuum pressure and in communication with the second working chamber B through the through hole 17, the gap g, and the through hole 18. The front opening of the valve portion 13c is closed at the second valve seat $10_2$ so that the vacuum pressure in the first working chamber A is transferred to the second working chamber B and the air pressures in both the working chambers A and B are balanced. Accordingly, the booster piston 2 is also located at the retracted position as indicated in the drawing under the bias of the return spring 7.

In the brake operation, when the brake pedal 52 is depressed and the input rod 11 and the valve piston 12 are advanced, the valve portion 13c forwardly biased by the valve spring 16 is advanced following to the valve piston 12, however, since the gap g between the first valve seat $10_1$ and the valve portion 13c is extremely thin as aforementioned, the valve portion 13c is seated on the first valve seat $10_1$ without delay so that the communication between both the working chambers A and B are cut off and, at the same time, the second valve seat $10_2$ is separated from the valve portion 13c so that the second working chamber B is placed into communication with the air inlet port 6 through the through hole 18 and the inside of the valve element 13. Thus the ambient air is induced into the second working chamber B without delay and the chamber B becomes of higher pressure than the first working chamber A. Owing to the above pressure difference between both the chambers A and B, a forward pushing force is applied to the piston diaphragm 3, the booster piston 2 is thereby moved forward against the return spring 7 to advance the output rod 22a through the elastic piston 21 so that the working piston 56 of the brake master cylinder M is driven forward and the brake is applied to the vehicle. On this occasion, the front side of the piston diaphragm 3 is forcibly brought into close contact with the rear end 46c of the bellows 46 under the pressure difference between both the working chambers A and B so that the communication between both the chambers A and B is completely cut off. When the forward pushing force is applied to the piston diaphragm 3 due to the pressure difference between said chambers A and B, forcible tensile forces are applied to each part of the diaphragm 3, however, since the peripheral edge of the through hole 32 most likely to be elongated is reinforced with the bead 3c and the bead 3c is firmly connected to the bead 3b formed on the inner periphery of the piston diaphragm 3 through the two straight beads 3d, the elongation at the peripheral edge of the through hole 32 can be restricted with the air of the beads 3b, 3c and 3d.

When the working piston 56 is driven, a foward thrust load is applied to the cylinder body 55 as abovementioned and then, through the tie rods 30, transmitted to and supported by the automobile body, that is, the front wall W of the compartment. The load is, therefore, not applied to the booster shell 1.

On the other hand, when the small shaft 12a of the valve piston 12 is advanced and abutted against the elastic piston 21 through the reaction piston 23, the reaction force of the output rod 22a is partly fed back to the side of the brake pedal 52 through the valve piston 12 owing to the expansion toward the side of the reaction piston 23 of the elastic piston 21 caused by the reaction force of the output rod 22a, so that the output of the output rod 22a, or the braking force, can be detected by the drivers.

Subsequently, when the depression on the brake pedal 52 is released, the input rod 11 is first retracted under the reaction force acting on the valve piston 12 and the biasing force of the return spring 24, whereby the second valve seat $10_2$ is seated on the valve portion 13c, which is abutted to the front face of the valve reaction sleeve 14, so that the axial compressive deformation is produced in the valve portion 13c under the retractive force from the input rod 11. In consequence, a gap larger than the initial one is made between the first valve seat $10_1$ and the valve portion 13c and the air pressures in both the working chambers A and B are equalized without delay through said gap. When the above pressure difference is disappeared, the booster piston 2 is retracted under the bias of the return spring 7 and the projections 3e is abutted to the rear inside wall of the booster shell 1 and is stopped. When the input rod 11 is abutted to the end wall 1e, the valve portion 13c is released from the retractive force of the input rod 11 and is restored to its original form so that the gap between the first valve seat $10_1$ and the valve portion 13 can again be reduced to that of small value 9.

If the brake pedal 52 is depressed and the booster piston 2 is advanced while the vacuum pressure is not accumulated in the first working chamber A, the air inside the first working chamber A is not sufficiently discharged into the vacuum supply source due to the resistance inside the pipe line or the like, so that the remaining air inside the first working chamber A is compressed. When air pressure of the second working chamber B is exceeded by that of the first working chamber A, a portion of the remaining air inside the first working chamber A enters a space between the rear surface of the booster piston 2 and the front surface of the piston diaphragm 3. Front surface portions of the piston diaphragm 3 surrounding the through hole 32 is thereby separated from the rear end 46c of the bellows 46 and a clearance is produced between both the diaphragm 3 and the rear end 46c of the bellows so that both the working chambers A and B are placed in communications with each other through the above clearance and the through hole 32 in the piston diaphragm 3. Thus, such troubles as the rearwardly swelling transformation in the piston diaphragm 3 caused by excessive rearward pushing forces can be prevented since the air pressures inside both the working chambers A and B become balanced with each other without delay through the clearance and the through hole 32.

When above pressure difference is eliminated, the front face of the piston diaphragm 3 is again placed into close contact with the rear end 46c of the flexible bellows 46.

As has been described above, according to the present invention, the annular beads are integrally formed around the inner peripheral edge of the piston diaphragm, which is fixed to the rear surface of the booster piston, and around the peripheral edge of the through hole of the piston diaphragm, the tie rod extending through the through hole, while two straight beads are protruded on one side of the piston diaphragm and almost in line with the common tangents to both of the annular beads for connection between those annular beads so that the mentioned peripheral edge of the through hole can be effectively reinforced by cooperation of those beads to prevent the tensile rigidity of the piston diaphragm from being lowered by the through hole, as a consequence of which the thrust load due to the pressure difference between the first and second working chambers can be efficiently transmitted from the piston diaphragm to the booster piston.

While an embodiment of the present invention has been shown and described, it will be apparent to those skilled in the art that various changes and modifications may be made therein without departing from the spirit of the invention or the scope of the appended claims.

What is claimed is:

1. A vacuum booster device comprising a booster shell, a booster piston axially slidably positioned in said booster shell, a piston diaphragm having inner and outer peripheral edges secured to the rear surface of said booster piston and the inner peripheral surface of said booster shell, a front side first working chamber and a rear side second working chamber defined in said booster shell by said booster piston and said piston diaphragm, said first working chamber communicating with a vacuum supply source, said second working chamber selectively communicating with said first working chamber or the external atmosphere through a control valve, an input rod located opposite to said booster piston for movement toward and away from said booster piston, said input rod being connected to said control valve to produce a pressure difference between said working chambers for causing said booster piston to follow the forward movement of said input rod, tie rods extending through said booster piston and said piston diaphragm for connecting the front and rear walls of said booster shell, said piston diaphragm having a plurality of through holes for passage of said tie rods, sealing means positioned between said tie rods and booster piston for permitting the free movement of said booster piston, said sealing means including a first annular bead integrally formed around the inner peripheral edge of said piston diaphragm, a plurality of second annular beads integrally formed around the peripheral edges of each of said through holes, and a plurality of paired straight beads formed on one side of said piston diaphragm and extending between said first bead and said second beads along common tangential lines with respect to said first bead and said second beads.

2. A vacuum booster device according to claim 1, wherein said first annular bead is in fitting engagement with an annular groove formed in the rear surface of said booster piston.

3. A vacuum booster device according to claim 1, wherein said second annular beads are arranged in a symmetric relation with respect to said first annular bead.

4. A vacuum booster device according to claim 1, wherein said booster shell is formed of light material including thin steel plate and synthetic resin.

5. A vacuum booster device according to claim 1, wherein said piston diaphragm is formed of elastic material.

6. A vacuum booster device according to claim 1, wherein said sealing means comprises flexible bellows respectively secured at one end to said booster piston and at the other end to said tie rods.

7. A vacuum booster device according to claim 6, wherein the peripheral edges of said piston diaphragm surrounding said respective through holes are closely but separably fitted to said one end of said flexible bellows so as to seal said through holes.

* * * * *